United States Patent [19]
Deichsel et al.

[11] 3,968,864
[45] July 13, 1976

[54] DISC BRAKE, ESPECIALLY FOR CRANE DRIVES

[75] Inventors: Klaus Deichsel; Hinrich Flessner; Henricus Theodorus Tromp, all of Wilhelmshaven, Germany

[73] Assignee: Fried. Krupp Gesellschaft mit beschrankter Haftung, Essen, Germany

[22] Filed: Apr. 2, 1975

[21] Appl. No.: 564,462

[30] Foreign Application Priority Data
Apr. 13, 1974   Germany............................ 2418225

[52] U.S. Cl................................ 188/71.9; 188/72.3; 188/72.9; 188/170; 188/196 BA
[51] Int. Cl.².................... F16D 55/10; F16D 65/56
[58] Field of Search.................... 188/56, 71.8, 71.9, 188/72.1, 72.3, 72.7, 72.9, 79.5 K, 170, 196 BA, 59

[56] References Cited
UNITED STATES PATENTS

| | | | |
|---|---|---|---|
| 2,697,497 | 12/1954 | Shively........................... | 188/79.5 K |
| 2,940,553 | 6/1960 | Newell et al. ................ | 188/196 BA |
| 3,124,219 | 3/1964 | Lee................................... | 188/72.3 |
| 3,322,235 | 5/1967 | Forbush........................ | 188/79.5 K |
| 3,324,976 | 6/1967 | Thegel ............................. | 188/170 |
| 3,707,208 | 12/1972 | Kyllonen ..................... | 188/196 BA |

FOREIGN PATENTS OR APPLICATIONS

| | | | |
|---|---|---|---|
| 1,284,189 | 11/1968 | Germany........................... | 188/72.9 |
| 1,289,690 | 2/1969 | Germany ........................... | 188/72.9 |
| 236,736 | 6/1969 | U.S.S.R................................ | 188/170 |

Primary Examiner—Trygve M. Blix
Assistant Examiner—Edward R. Kazenske
Attorney, Agent, or Firm—Walter Becker

[57] ABSTRACT

A disc brake arrangement, especially for heavy duty applications in which a pair of brake arms having brake members on the sides facing each other are pivotally supported at one end and spring biased toward each other at the other end. The brake members are adapted to receive the periphery of a brake disc therebetween. A disengaging device is provided which includes a lever pivoted to the free ends of the arms and having a wedge shaped nose which will press the arms apart when the lever is pivoted in one direction and which will cam out between the arms when the lever is released. The brake members are adjustably mounted on the respective arms and each brake member support includes an adjustment, with each adjustment being provided with a free wheeling one way clutch device. A lost motion linkage connects each free wheeling device with the disengaging lever for actuation of the pertaining adjustment in a direction to move the brake members toward each other whenever the movement of the lever between brake disengaging and brake engaged positions exceeds a predetermined amount.

14 Claims, 9 Drawing Figures

DISC BRAKE, ESPECIALLY FOR CRANE DRIVES

The present invention relates to disc brakes for crane drives. Disc brakes are advantageous over double jaw brakes, primarily when great braking power output is involved, for instance, with crane driving mechanisms, because they have relatively smaller moments of inertia than double jaw brakes, and therefore a smaller proportion of the braking power is lost by braking the disc brakes, and because the conditions for the heat withdrawal are more favorable with disc brakes.

It is an object of the present invention to provide a disc brake with an automatic adjustment of the braking jaws for purposes to compensate for the wear of the brake linings.

This object and other objects and advantages of the invention will appear more clearly from the following specification, in connection with the accompanying drawings, in which:

The present invention brings about the advantage that the wear of the brake lining will not affect the power output of the disc brakes. Furthermore, it is important that the post-adjusting device for the braking jaws when it is formed according to the invention by screw bodies inserted in threaded bores of the braking plates is relieved from the forces by pendulum supports which act tangentially with regard to the rotary movement of the brake discs so that the thread of the screw bodies as well as the thread in the threaded bores of the braking plates will be saved as will be described further below.

Figure 5:
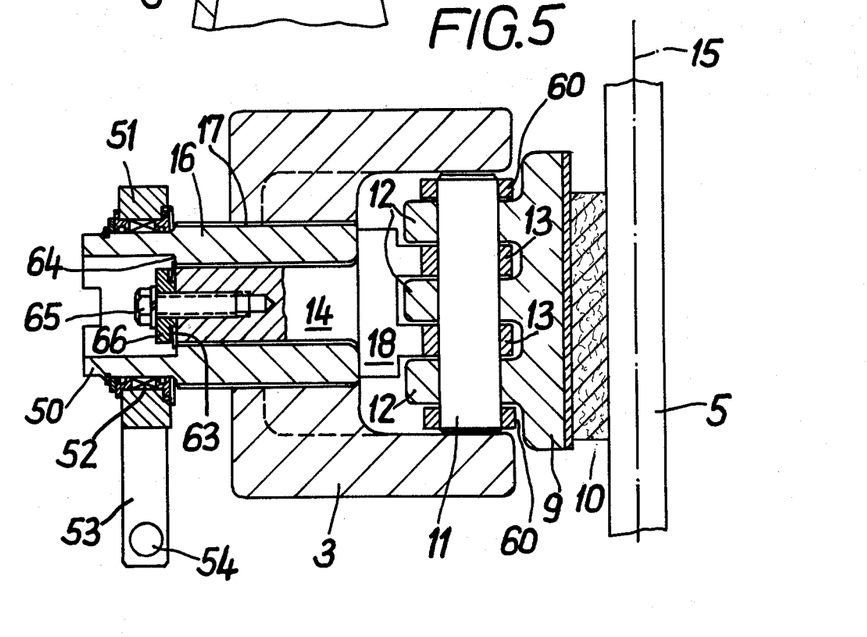
FIG. 5 represents a section taken along the line V—V of FIG. 3, but on a larger scale than that of FIG. 3.

Referring now to the drawings in detail, the lower ends of the two brake plates 3 are on a base plate 1 journaled in two pairs of eyes 2 by means of horizontal joint bolts 4 which are parallel to each other. The brake plates 3 have U-shaped cross sections which are open toward the brake disc 5 extending between the said brake plates 3. The legs of the brake plates 3 have those sides thereof which face away from each other provided with downwardly extending adjusting screws 6. Below said screws 6 there are provided abutment caps 7, one of which is by means of dish springs 8 supported on the base plate, whereas the other one is directly supported on the base plate. The brake plates 3 normally extend upwardly parallel to each other from the joint bolts 4, while between the screws 6 and the abutment caps 7 there are provided adjustable caps. The brake jaws 9 when in braking condition have their linings 10 in engagement with both sides of the brake disc 5. The brake jaws 9 are journaled on the brake plates 3 approximately at half the height of the latter. This is effected by means of joint bolts 11 which in parallel arrangement to the joint bolts 4 extend through bores of comb-like interengaging eyes 12, 13 of the brake body 9 or intermediate members 14 (FIG. 5). The intermediate members 14 are formed by bolts, the common center line of which, extends perpendicularly with regard to the vertical central plane 15 of the brake disc 5. The members 14 are journaled in bushings 16 which with a round thread 17 each arranged coaxially with regard to the central plane of the members 14 are screwed into a threaded bore of a thickened portion of one of the brake plates 3 each. By means of a collar 18, each of the two intermediate members 14 engages that end face of bushing 16 which faces toward the brake jaws 9.

Figure 4:
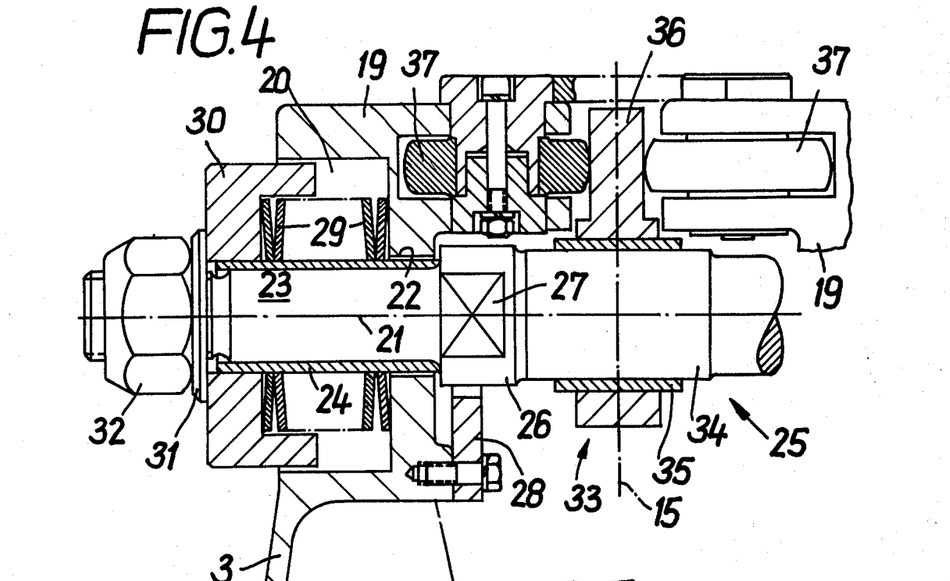
FIG. 4 is a section taken along the line IV—IV of FIG. 2.

The brake plates 3, as shown in FIG. 4, form at their upper ends heads 19 with cylindrical recesses 20, the common center line 21 of which, extends perpendicularly with regard to the vertical central plane 15 of the brake disc 5. The recesses 20 are open on those sides which are opposite to each other. The heads 19 have bores 22, the common central plane of which, coincides with the center line 21 of the recesses 20. Cylindrical pivots 23 with sleeves 24 placed thereon extend through the bores 22 into the recesses 20. The pivots 23 form portions of a rod 25 extending through the heads 19. The center line of said rod 25 coincides with the center line 21 of the recesses 20. One pivot 23 is adjacent a thickened portion 26 of rod 25 which has two plane parallel surfaces 27. These surfaces are engaged by two forked arms of a holder 29 which is screwed onto a head 19. In this way the rod 25 is prevented from turning.

Within the recesses 20 there are provided dish springs 29 which surround the sleeves 24. These dish springs 29 rest on one hand against the heads 19, and on the other hand against caps 30 which are displaceably guided on the sleeves 24 and with one collar each engage the recesses 20. The caps 30 rest in axial direction through washers 31 on nuts 32 which have been screwed onto the threaded outer ends of the bolts 23.

The dish springs 29 exert pressure forces onto the heads 19 of the brake plates, which pressure forces are directed toward each other. Due to these pressure forces the linings 10 of the brake jaws 9 are by means of the brake plates 3 pressed against the brake disc 5 when the brake is not disengaged in the manner described further below. By tightening the nuts 32, the braking force exerted by the dish springs 29 can be reinforced. For purposes of disengaging the brake, there is provided an adjusting lever 33 which is mounted on a cylindrical central section 34 of rod 25 and is rotatable about the center line 21 through the intervention of a sleeve 35. The vertical longitudinal central plane of said lever 33 coincides with the vertical central plane 15 of the brake disc 5.

The adusting lever 33 has a wedge-shaped nose 36 above the central section 34. Rollers 37 engage the wedge-shaped surfaces of this nose. The rollers 37 are with vertical axes of rotation journaled on extensions of the heads 19. The lever arm of the adjusting lever 33 extends from the central section 34 of rod 25 normally in horizontal direction opposite to the decreasing taper portion of the wedge-shaped nose 36. The adjusting lever is so acted upon by a helically wound torsion spring 38 that said spring has the tendency to pivot the lever arm end of the adjusting lever in upward direction. This spring is placed on that section of rod 25 which is adjacent to the central section 34 on that side of the section 34 which is located opposite the enlargment 20. One end of the torsion spring 38 is by means of a screw 39 connected to one brake plate 3, whereas its other end engages a groove 40 at the bottom side of the adjusting lever 33. The adjusting lever 33 is approximately at the center between the nose 36 and the lever arm end provided with a transverse bore 41 through which extends a round bar 42. This bar 42 is parallel to the rod 25 and projects at both sides beyond the heads 19 of the brake plates. The round bar 42 serves for connection of a link which on the other hand is connected to the movability of a brake disengaging device 43. This device is in approximately vertical arrangement provided on a base 44 of the base plate 1 by means of a horizontal joint bolt 45. This link or guide rod comprises two plates 46 which are arranged on both sides adjacent the adjusting lever 33. The said guide rod extends from a bolt 47 which interconnects said two plates 46 and passes through bores of plates 46 in such a way that the guide rod is located below a channel or fillet 48 at the bottom side of the lever arm end of the adjusting lever 33.

Figure 1:
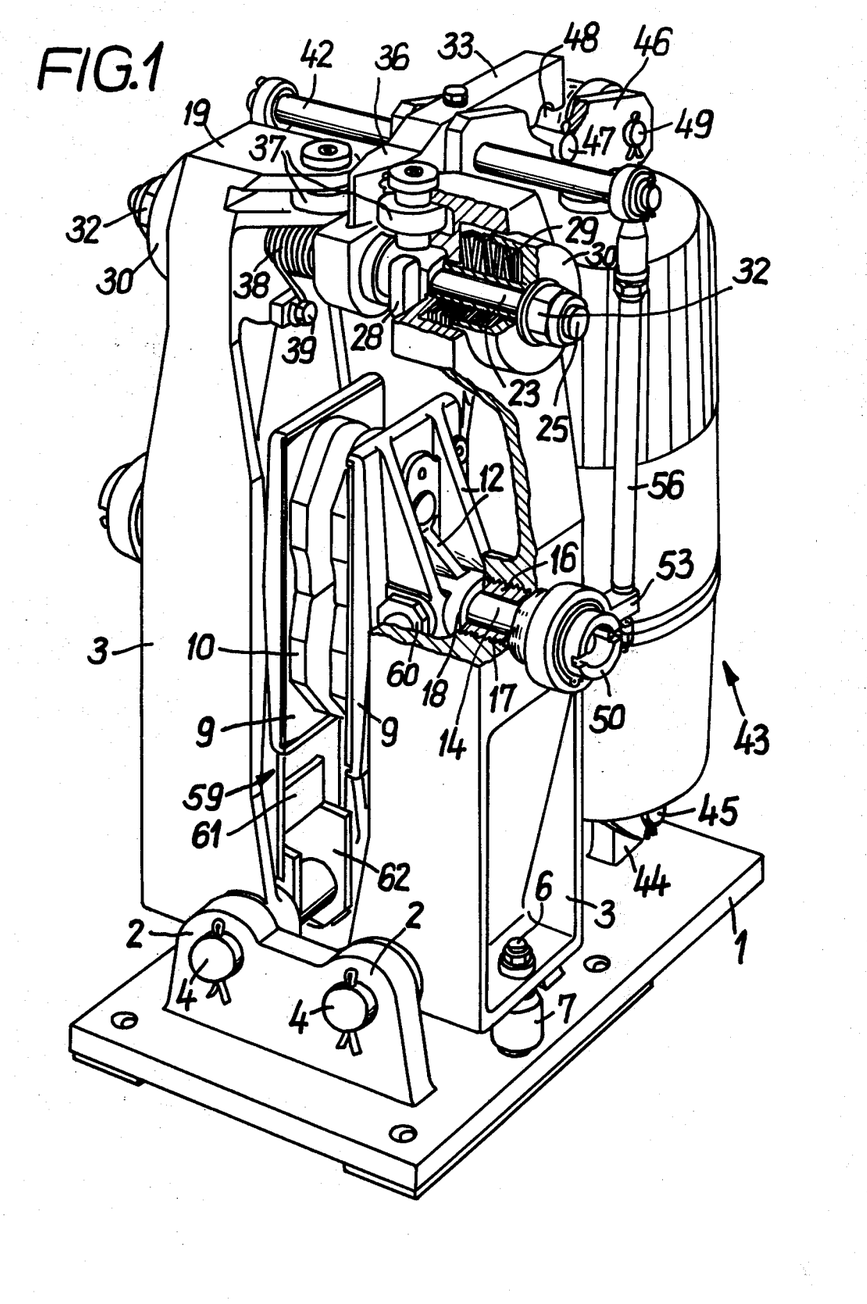
FIG. 1 shows an isometric view of a disc brake without the brake disc.
Figure 2:
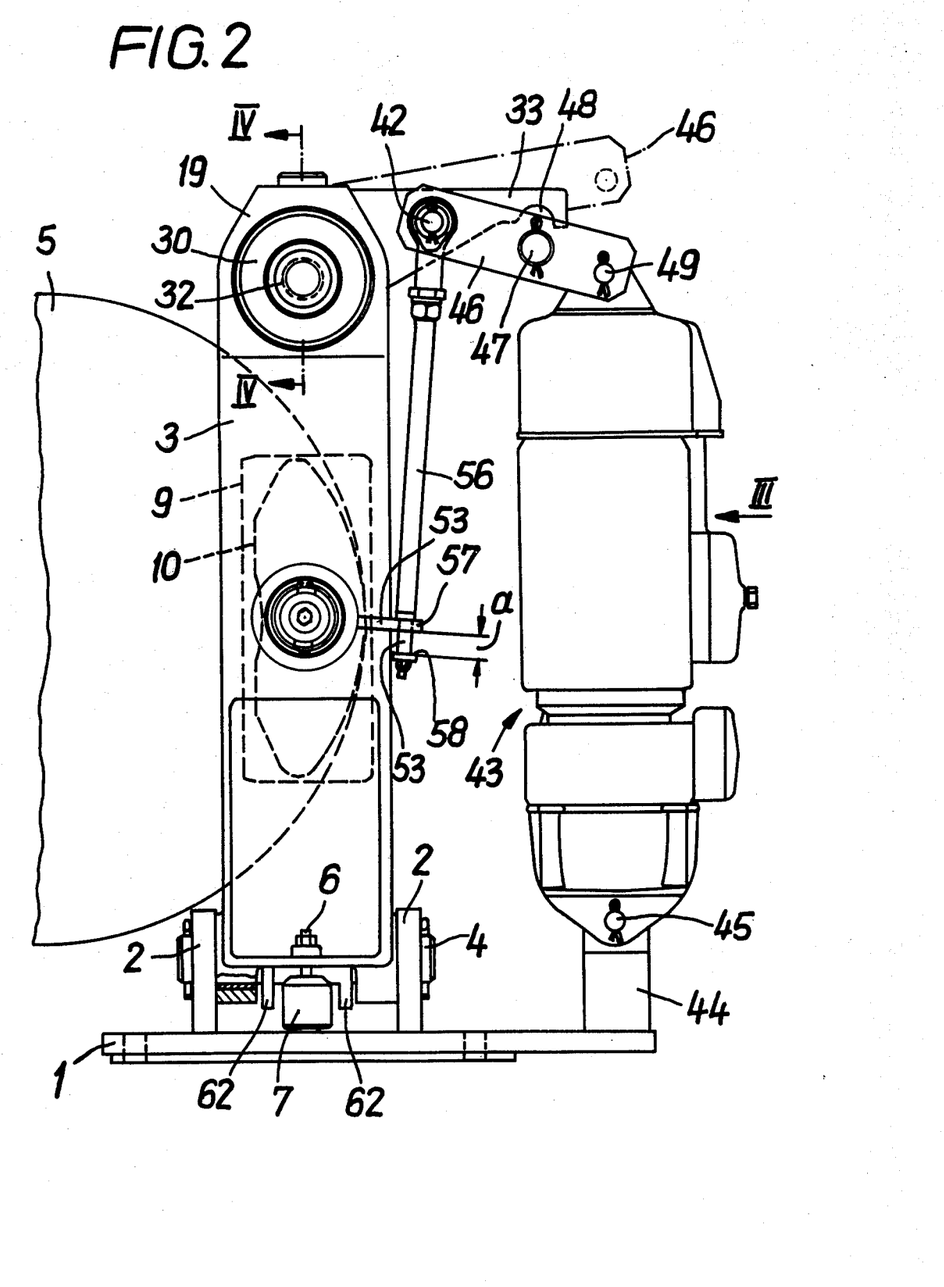
FIG. 2 is a side view of the disc brake according to the invention.
Figure 8:
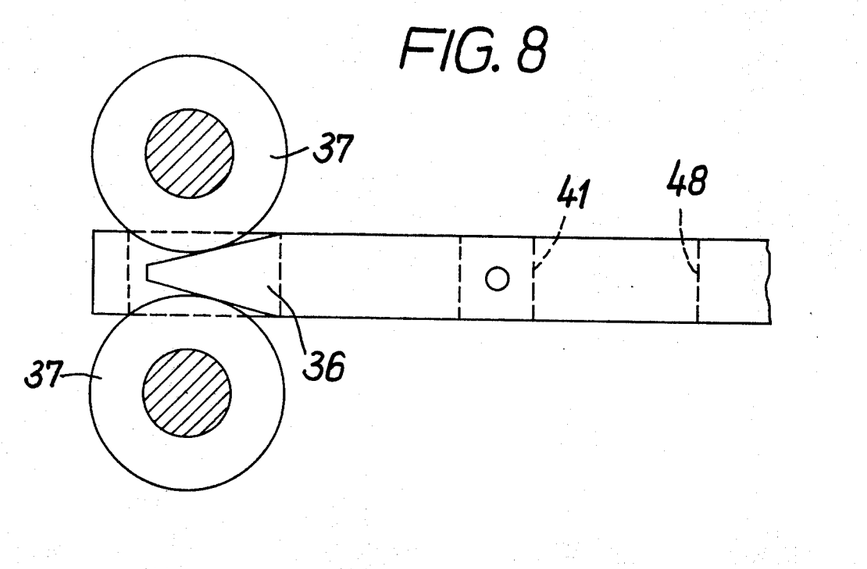

In conformity with the illustration shown in FIG. 2 in solid lines, the movable part of the disengaging device 43 is in its inward moved position. Accordingly, the brake is not disengaged because the electric motor of the transmission to be braked is turned off or because the current from the network failed. The adjusting lever 33 occupies its horizontal position. The wedge-shaped nose 36 extends only partially between the rollers 37 as shown in FIG. 8. Accordingly, the brake plates 3 are, by means of dish springs 29, pivoted toward each other to such an extent that the brake linings 10 are firmly pressed against the brake disc 5. Thus, the brake is effective. The links 46 extend from the round bar 42 at an inclination downwardly to the joint bolts 49 by means of which the members 46 are connected to the movable moved-in portion of the disengaging device 43. Consequently, the bolt 47 is in spaced relationship to and below the channel or fillet 48.

When the electric motor is turned on, the brake is disengaged. The movable part of the device 43 then moves upwardly and pivots the members 46 upwardly. When in this connection the bolt 47 enters the channel 48, it will during the further movement of the parts 46 in upward direction take along the adjusting lever 33 so that the latter together with the parts 46 is pivoted into the position shown in FIG. 6. This position is shown in FIG. 2 by dot-dash lines. Accordingly, the wedge-shaped nose 36 is turned further between the rollers 37 further into the position which is shown in FIG. 7. As a result thereof, the heads 19 are against the thrust of the dish springs 29 pressed against each other. Accordingly, the brake plates 3 are spread apart, and the linings 10 of the brake jaws 9 are lifted off said brake disc 5.

There will now be explained how the brake jaws 9 are automatically adjusted when the linings 10 wear.

Figure 3:
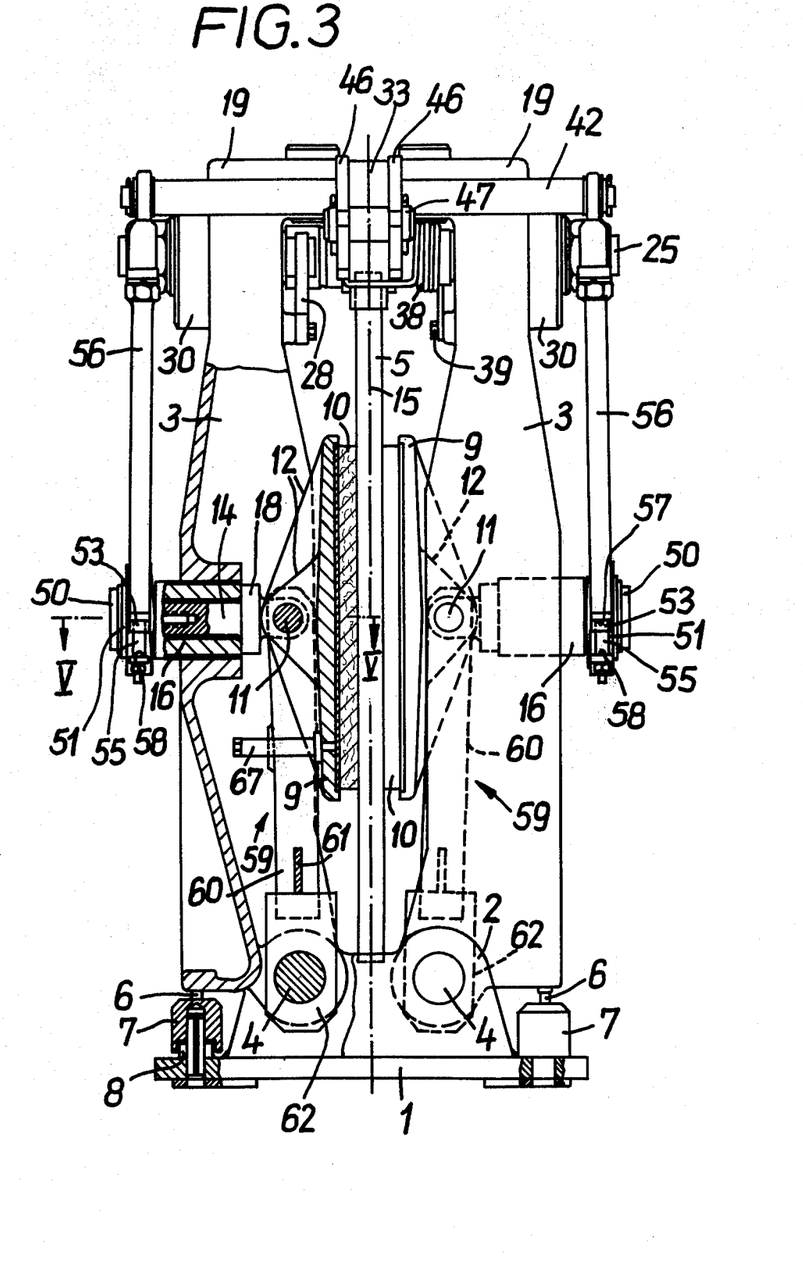
FIG. 3 shows a view of the disc brake without the brake disengaging device, said view being seen in the direction of the arrow III of FIG. 2.

The post-adjustment of the brake jaws 9 is effected by screwing the bushings 6 into the brake parts 3 by a distance which corresponds to the wear of the linings. The rounded thread 17 of that bushing 16 which is illustrated in FIG. 5 and in the left-hand section of FIG. 3 is left-hand thread, whereas the round thread of the oppositely located bushing is right-hand thread. Rings 51 of free-wheeling one way clutch devices are mounted on hollow cylindrical extensions of the bushings 16. The rollers of said rings 51 are designated with the reference numeral 52. The rings 51 are equipped with arms 53 which extend at a slight inclination in downward direction toward the disengaging device. The ends of the arms 53 are provided with bores 54 through which extend with play cylindrical extensions 55 of two rods 56, the upper ends of which are mounted on the ends of the round bar 42. The rods 46 have above the arms 53 a greater diameter than the bores 54 and the cylindrical extensions 55 at the shoulders 57, which represent upper abutments for the arms 53. Provided on the lower ends of the cylindrical extensions 55 are collars which are held by nuts and the upper surfaces 58 of which form lower abutments for the arms 53.

When the linings 10 have not materially worn and when the disengaging device 43 occupies its ineffective position, in other words, when the linings under the influence of the dish springs 29 under pressure engage the brake disc 5, while the adjusting lever 33 occupies its horizontal position shown in FIG. 2, the shoulders 57 of the rods 56 rest upon the top sides of the arms 53. Between the lower sides of the arms 53 and the upper surfaces 58 of the collars at the lower end of the cylindrical extensions 55, there exists a space $a$.

When subsequently the brake is disengaged, the parts 46 are pivoted upwardly by the outwardly moving part of the disengaging device 43. This will for the time being not affect the adjusting lever 33. Only when the bolt 47 has entered the channel 48, the adjusting lever 33 will be taken along until the latter together with the parts 46 has occupied the position shown in FIG. 2 by dot-dash lines. The rods 56 move upwardly by the distance $a$. Accordingly, the upper surfaces 58 will engage the lower surfaces of arms 53 which will thus not be pivoted when disengaging the brake, as long as the linings 10 are not materially worn.

Figure 9:
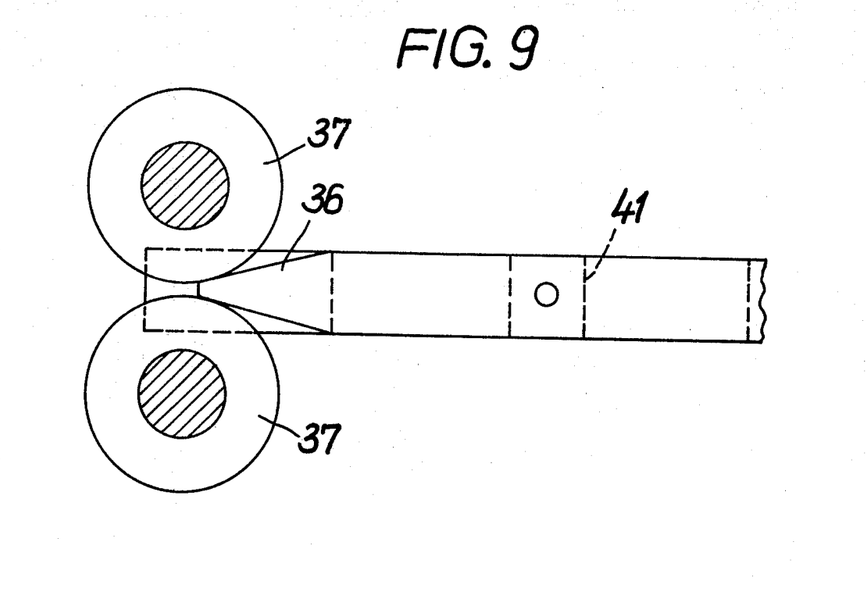

In order to assure that the necessary braking effect occurs during the turning off of the motor, it is necessary that when the linings 10 have been worn, the brake parts 3 have to be further pivoted toward each other than before in order to bring about the necessary engagement of the now thinner linings 10 on the brake dics 5. Accordingly, the rollers 37 move further toward each other than was the case in FIG. 8 as is clearly indicated in FIG. 9. This is brought about by the forces which are exerted by the dish springs 29 upon the heads 19. Due to the pressure forces exerted on both sides upon the wedge-shaped surfaces of nose 36, nose 36 is displaced and consequently the adjusting lever 33 is pivoted downwardly beyond the illustrated position shown in FIG. 2. Consequently, the rods 56 move downwardly and the levers 53 are pivoted downwardly by the shoulders 57 engaging the upper sides of said levers 53. The inherent rotation of the rings 51 of the free-wheeling devices on both sides will have no influence upon the bushings 16 while the direction of rotation of the rings 51 corresponds to the free wheeling. The parts 46 extend from the round bar 42 which is now somewhat lower than it was in its position of FIG. 2, at a slight inclination downwardly toward the joint bolts 49 in the moved-in part of the disengaging device 43. Correspondingly, the vertical distance of the bolt 47 from the engaging surface of the channel 48 is somewhat less than before.

When subsequently the brake is disengaged, the bolt 47 enters the channel 48 after a slight outward movement of the movable part of the disengaging device.

Figure 6:
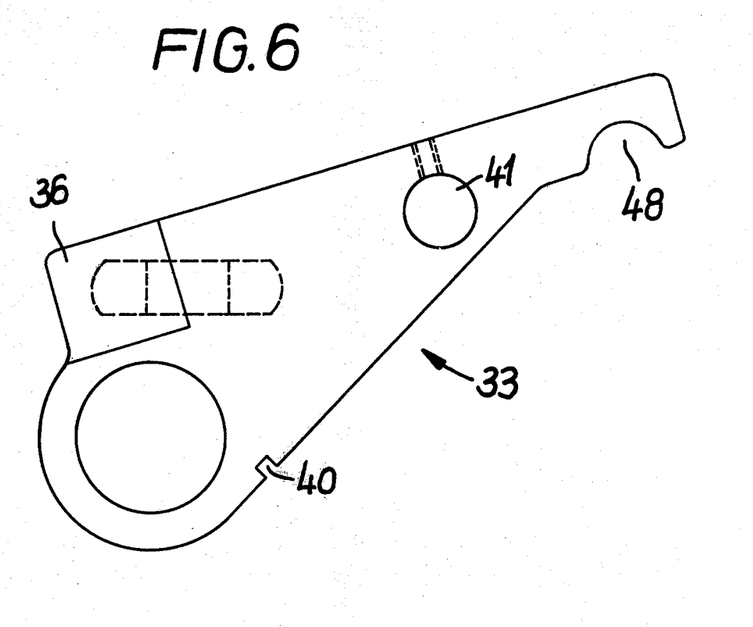
FIG. 6 shows a side view of the adjusting lever.
Figure 7:
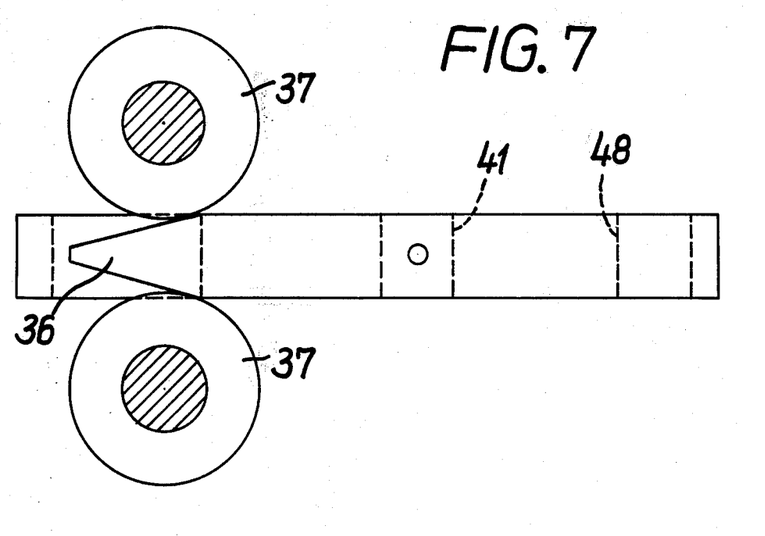
FIGS. 7, 8 and 9 respectively illustrate a top view of the adjusting lever with two rollers in different positions.

Consequently, until the adjusting lever 33 has passed into the position corresponding to the disengagement of the brake in conformity with the dot-dash lines in FIG. 2 and FIGS. 6 and 7, a greater portion of the working stroke of the disengaging device 43 is taken advantage of to pivot the adjusting lever 33 in upward direction. Consequently, the rods 56 move by a greater distance than $a$ in upward direction. Accordingly, the upper surfaces 58 take along the arms 53 in upward direction by a distance by which previously the arms had been moved downwardly by the shoulders 57 in view of the wear of the linings 10. Thus, the arms 53 are pivoted upwardly. During the inherent turning movement of the rings 51 of the free-wheel one way clutch devices, the bushings 16 are likewise turned because the rotation is effected in the blocking direction. The bushings 16 are therefore in view of the lefthand and right-hand rounded thread 17 screwed in the direction toward the brake disc 5 so that the brake jaws 9 are moved closer to the brake disc 5 and the wear of the linings 10 is compensated for.

The friction forces which occur during the braking operation between the brake disc 5 and the linings 10 and which act tangentially with regard to the turning movement of the brake disc, tend to take along the brake jaws 9. If the corresponding downwardly directed forces were by the intermediate members 14 and bushings 16 through the round thread 17 conveyed into the brake parts, the round thread would soon be destroyed. Therefore, the mentioned forces are absorbed by pendulum supports 59 in such a way that without loading the intermediate members 14 and bushings 16 they are with the round thread 17 guided into the base plate 1. Each pendulum support has two flat tools 60 which while being arranged parallel to each other are held together at their lower end by a welded-on web 61. The free ends of said tools 60 are provided with bores through which extend the ends of the joint bolt 11 which project beyond the eyes 12. Adjacent to the tools 60 and the web 61 there are provided in a fork-shaped manner two ears 62 which have bores through which passes that joint bolt 4 which supports the respective brake part 3. Thus, the two pendulum supports 59 extend from the joint bolt 4 in the interior of the brake parts 3 in a nearly vertical direction and upwardly. The two pendulum supports 59 follow the movements of the joint bolts in horizontal direction when the linings 10 are pressed against the brake disc 5 and automatically follow the movements of the joint bolts during the post-adjustment of the brake jaws 9 as well as when disengaging the brake. The pendulum supports 59 convey the forces acting in vertical direction upon the brake jaws 9 so that the intermediate members 14 and the bushings 16 with rounded thread 17 are only under the load of axial forces.

Moreover, it is an object of the pendulum supports 59 to secure the intermediate members 14 against rotation. Therefore, the intermediate members 14 are not taken along when the bushings 16 are turned for purposes of post-adjusting the brake jaws.

In order to assure that during the post-adjustment of the brake jaws 9, a certain preload prevails in the free-wheeling devices 51, 52 and that the bushings 16 are not moved too far in backward direction, a friction connection is established between the intermediate members 14 and the bushings 16. To this end, within the hollow cylindrical step 50, of each of the two bushings 16, a dish spring 63 is pressed against a shoulder 64 of the bushing 16. This is affected by means of a screw 65 with the aid of an annular disc 66 which screw 65 is screwed into an axial threaded bore of the intermediate member 14. Provided on both pendulum supports are holding means 67 by means of which the brake jaws 9 are held with a certain yieldability so that the engaging surfaces of the linings 10 will also in disengaged position of the brake be located approximately parallel to the brake disc 5.

It is, of course, to be understood that the present invention is, by no means, limited to the specific showing in the drawings, but also comprises any modifications within the scope of the appended claims.

What is claimed is:

1. A disc brake having a pair of arms pivotally supported at one end and adapted to receive the periphery of a brake disc therebetween, means biasing the free ends of said arms toward each other, brake elements on the sides of the arms which face each other, adjustable means connecting said brake elements to said arms for adjustment of brake elements toward each other, a disengaging device including a lever pivotally connected to the free ends of the arms having a nose thereon operable when the lever is pivoted in one direction to press said arms apart, said nose camming out from between said arms when the lever is released, an actuator pivoted on said lever and when moved in one direction abutting said lever and moving said lever in said one direction, a free wheeling one way clutch device connected to each adjustable means, and a link forming a lost motion connection between each free wheeling device and the axis of pivotal connection of said actuator to said lever.

2. A disc brake according to claim 1 in which each adjustable means comprises a body screw threaded into the respective arm and supporting the respective brake member, the respective free wheeling device being mounted on said body and operable when actuated by the respective link to turn the body in one direction only.

3. A disc brake according to claim 1 which includes a base member on which said one ends of said arms are pivotally supported, and support rods each having one end connected to said brake member and the other end supported by said base member, said support rods sustaining the braking loads imposed on said brake member by rotation of the brake disc.

4. A disc brake according to claim 3 which includes a pivot connecting each brake member to the respective arm, each support rod having one end connected to the pivot for the respective brake member and the other end pivotally supported on said base member.

5. A disc brake according to claim 3 which includes spring means acting between each brake member and the respective support rod.

6. A disc brake according to claim 2 which includes a nonrotatable intermediate member in each body and to which intermediate member the respective brake member is connected, and means forming a friction connection between each body and the respective intermediate member.

7. A disc brake according to claim 1 in which each said free wheeling device includes an actuating arm, the respective link having spaced collars thereon between which said actuating arm is disposed, one of said collars being adjustable on the link for varying the amount of said lost motion.

8. A disc brake according to claim 1 in which the pivotal connection between said lever and said actuator comprises a shaft, a respective link pivoted to each end of said shaft, each free wheeling device having an actuating arm thereon with a hole therein, a reduced diameter region on each link extending through said hole and forming a shoulder on one side of said actuating arm, and a collar adjustably mounted on the link on the other side of said actuating arm.

9. A disc brake according to claim 1 in which said actuator includes a pin portion engageable with said lever when said actuator is moved in said one direction.

10. A disc brake according to claim 9 in which said actuator is in the form of a pair of plates which receive said lever therebetween.

11. A disc brake according to claim 9 in which said actuator comprises a pair of plates with one plate on each side of said lever, a pivot pin extending through said plates and lever and pivotally interconnecting said lever and actuator, said lever having a notch which said pin portion engages to form the abutting engagement between said actuator and said lever.

12. A disc brake according to claim 11 in which said pivot pin is elongate and one of said links is pivotally connected to each end thereof.

13. A disc brake according to claim 1 which includes a rod extending nonrotatably through the free ends of said arms, said lever being pivotally mounted on said rod, spring elements near the ends of said rod acting on said arms, and adjustable abutments on the ends of said rods engaging the ends of said spring elements which face away from said arms.

14. A disc brake according to claim 1 in which said nose is wedge shaped and the free ends of said arms include rollers for engagement with opposite sides of the wedge shaped nose of said lever.

* * * * *